United States Patent
Nakai et al.

(10) Patent No.: US 8,263,286 B2
(45) Date of Patent: Sep. 11, 2012

(54) MEMBRANE-ELECTRODE ASSEMBLY AND POLYMER ELECTROLYTE FUEL CELL

(75) Inventors: Shinji Nakai, Tsukuba (JP); Keiji Kubo, Tsukuba (JP); Tomohiro Ono, Tsukuba (JP); Hiroyuki Ohgi, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 215 days.

(21) Appl. No.: 12/812,901

(22) PCT Filed: Jan. 28, 2009

(86) PCT No.: PCT/JP2009/051355
§ 371 (c)(1),
(2), (4) Date: Jul. 14, 2010

(87) PCT Pub. No.: WO2009/098982
PCT Pub. Date: Aug. 13, 2009

(65) Prior Publication Data
US 2010/0310965 A1    Dec. 9, 2010

(30) Foreign Application Priority Data
Feb. 6, 2008 (JP) ................................. 2008-026626

(51) Int. Cl.
*H01M 8/10* (2006.01)
(52) U.S. Cl. ......... 429/483; 429/491; 429/480; 429/534
(58) Field of Classification Search .................. 429/483, 429/482, 491, 492, 480, 481, 523, 529, 534
See application file for complete search history.

(56) References Cited

U.S. PATENT DOCUMENTS

| | | | |
|---|---|---|---|
| 2003/0198849 A1* | 10/2003 | Hampden-Smith et al. | 429/30 |
| 2006/0090317 A1* | 5/2006 | Wang et al. | 29/2 |
| 2007/0117872 A1 | 5/2007 | Kawai et al. | |
| 2007/0141473 A1* | 6/2007 | Yang et al. | 429/303 |
| 2008/0113244 A1 | 5/2008 | Yamashita et al. | |
| 2010/0233569 A1 | 9/2010 | Ono et al. | |
| 2010/0323269 A1 | 12/2010 | Nakai et al. | |

FOREIGN PATENT DOCUMENTS

| | | |
|---|---|---|
| EP | 1 852 928 A1 | 11/2007 |
| EP | 1 986 257 A1 | 10/2008 |
| EP | 2 131 424 A1 | 12/2009 |
| JP | 8-64221 | 3/1996 |
| JP | 2000-195527 | 7/2000 |
| JP | 2003 142125 | 5/2003 |
| JP | 2003-142125 | 5/2003 |
| JP | 2005-190749 | 7/2005 |
| JP | 2005 194517 | 7/2005 |
| JP | 2006 202737 | 8/2006 |
| JP | 2007-194048 | 8/2007 |
| JP | 2007 194048 | 8/2007 |
| JP | 2007 258162 | 10/2007 |
| JP | 2007-305315 | 11/2007 |
| JP | 2007 305315 | 11/2007 |
| WO | WO 2007/086309 A1 | 8/2007 |

OTHER PUBLICATIONS

Extended European Search Report issued Dec. 22, 2011, in European Patent Application No. 09708609.4.

* cited by examiner

*Primary Examiner* — Raymond Alejandro
(74) *Attorney, Agent, or Firm* — Oblon, Spivak, McClelland, Maier & Neustadt, L.L.P.

(57) ABSTRACT

A membrane-electrode assembly for polymer electrolyte fuel cells comprising a polymer electrolyte membrane and two gas diffusion electrodes being bonded to the membrane so that the membrane can be between them, in which assembly each gas diffusion electrode is comprised of an electrode catalyst layer and a gas diffusion layer, intermediate layer(s) being an ion conductor is/are arranged between the electrode catalyst layer(s) and the membrane, the ion conductor mainly comprises a block copolymer comprising a polymer block (A) having ion-conductive groups and a polymer block (B) having no ion-conductive group, both blocks phase-separate from each other, (A) forms a continuous phase, and the contact part(s) of the intermediate layer(s) with the polymer electrolyte membrane and the contact part(s) of the intermediate layer(s) with the electrode catalyst layer(s) are comprised of polymer block (A) having ion-conductive groups; and a polymer electrolyte fuel cell wherein the assembly is used. By the invention, a membrane-electrode assembly and a fuel cell are provided which are economical, environment-friendly, good in moldability, and small in interface resistance and excellent in power generation efficiency.

13 Claims, 4 Drawing Sheets

MEMBRANE-ELECTRODE ASSEMBLY AND POLYMER ELECTROLYTE FUEL CELL

TECHNICAL FIELD

This invention relates to a membrane-electrode assembly and a polymer electrolyte fuel cell.

BACKGROUND ART

In recent years, as a power generation system which is mild to the global environment and clean, fuel cells have drawn attention. Fuel cells are classified, depending on kinds of electrolytes, into a phosphoric acid type, a molten carbonate type, a solid oxide type, a polymer electrolyte type, etc. Among them, polymer electrolyte fuel cells are tried to be applied as power sources for electric vehicles, power sources for portable apparatuses, and, further, applied to domestic cogeneration systems utilizing electricity and heat at the same time, from the viewpoints of workability at low temperatures, miniaturization and lightening, etc.

A polymer electrolyte fuel cell is generally composed as follows. First, on both sides of a polymer electrolyte membrane having ion conductivity (the ion is usually proton), electrode catalyst layers comprising a platinum group metal catalyst supported on carbon powder and an ion-conductive binder comprising a polymer electrolyte are formed, respectively. On the outsides of the electrode catalyst layers, gas diffusion layers as porous materials through which fuel gas and oxidant gas can pass are formed, respectively. As the gas diffusion layers, carbon paper, carbon cloth, etc. are used. An integrated combination of the electrode catalyst layer and the gas diffusion layer is called a gas diffusion electrode, and a structure wherein a pair of gas diffusion electrodes are bonded to the electrolyte membrane so that the electrode catalyst layers can face to the electrolyte membrane, respectively, is called a membrane-electrode assembly (MEA). On both sides of the membrane-electrode assembly, separators having electric conductivity and gastightness are placed. Gas paths supplying the fuel gas or oxidant gas (e.g., air) onto the electrode surfaces are formed, respectively, at the contact parts of the membrane-electrode assembly and the separators or inside the separators. Power generation is started by supplying a fuel gas such as hydrogen or methanol to one electrode (fuel electrode) and an oxidant gas containing oxygen such as air to the other electrode (oxygen electrode). Namely, the fuel gas is ionized at the fuel electrode to form protons and electrons, the protons pass through the electrolyte membrane and transferred to the oxygen electrode, the electrons are transferred via an external circuit formed by connecting both electrodes into the oxygen electrode, and they react with the oxidant gas to form water. Thus, the chemical energy of the fuel gas is directly converted into electric energy which can be taken out.

Further, in addition to such proton exchange-type fuel cells, anion exchange-type fuel cells using an anion-conductive membrane and an anion-conductive binder (the anions are usually hydroxide ions) are also studied. The constitution of a polymer electrolyte fuel cell in this case is basically the same as in the proton exchange-type fuel cell except that an anion-conductive membrane and an anion-conductive binder are used in place of the proton-conductive membrane and the proton-conductive binder, respectively. As to the mechanism of generation of electric energy, oxygen, water and electrons react at the oxygen electrode to form hydroxide ions, the hydroxide ions pass through the anion-conductive membrane and react with hydrogen at the fuel electrode to form water and electrons, and the electrons are transferred via an external circuit formed by connecting both electrodes into the oxygen electrode and react again with oxygen and water to form hydroxide ions. Thus, the chemical energy of the fuel gas is directly converted into electric energy which can be taken out.

The above electrode reactions take place at three-phase interfaces formed by a gaseous phase as a supplying path of the fuel gas or oxidant gas, a liquid phase as an ion path and a solid phase as an electron path. The ion-conductive binder is used for the purpose of binding the catalyst and heightening the utilization efficiency of the catalyst by mediating the transfer of protons or hydroxide ions from the electrode catalyst layer to the electrolyte membrane. Therefore, catalyst particles not contacting with the ion path formed by the ion-conductive binder cannot take part in the formation of the three-phase interfaces, and it is hard for such particles to contribute to the reaction. Further, in order to obtain high efficiency, the minute structural design of the electrode catalyst layer including pore structure for diffusing fuel gas or oxidant gas, the dispersion state of the catalyst, etc. becomes important. Further, at the gas diffusion electrode parts, there arises a case wherein the catalyst surface is covered with water contained in the reaction gases or water formed at the oxygen electrode or the fuel electrode, and the fuel gas or the oxidant gas cannot contact with the catalyst surface, and as a result, power generation is stopped, or a case wherein such water prevents the fuel gas or oxidant gas from being supplied or discharged to stop the electrode reaction. Therefore, the water repellency of the gas diffusion electrode part is required.

As a method for preparation of a membrane-electrode assembly, a method is known which comprises arranging a gas diffusion electrode prepared by applying a catalyst slurry wherein an electrode catalyst, a polymer electrolyte, and so on are dispersed by mixing in a solvent onto a gas diffusion base material, and drying it, and a polymer electrolyte membrane so as to be the order of the gas diffusion electrode/the polymer electrolyte membrane/the gas diffusion electrode, and bonding the resulting composite by a hot press or the like.

As a polymer electrolyte membrane, Nafion (registered trademark of Dupont Co., which is the same hereinafter) which is a perfluorocarbonsulfonic acid polymer, is generally used from the reason that it is chemically stable. A Nafion membrane has such a structure that spherical clusters having a size of the order of several nm are mutually connected via channels having a narrow interval of the order of 1 nm, by action of strong hydrophobicity of the main chains and hydrophilicity of the sulfonic acid groups, and shows high ion conductivity. Nafion is also used in an electrode catalyst layer in order to form three-phase interfaces acting as electrode reaction sites.

In usual membrane-electrode assemblies, Nafion is used both as a polymer electrolyte membrane and an electrolyte in the electrode catalyst layer. Namely, since electrolytes of the same composition are used, it is comparatively easy to obtain good bonding strength and a good electric bonding state. However, even when Nafion is used both as a polymer electrolyte membrane and an electrolyte in the electrode catalyst layer, there is interface resistance between the membrane and the electrode, and it is pointed out that internal loss of the cell caused by interface resistance arises to lower power generation efficiency. Since the electrode catalyst layer has a porous structure, the surface of the electrode catalyst layer has an uneven structure, and a problem is also pointed out that the reaction area of the electrode catalyst layer is decreased because the electrolyte membrane does not follow the uneven structure. Especially, when an electrolyte other than Nafion such as a hydrocarbon electrolyte is used as either of the electrolyte membrane and the electrolyte in the electrode catalyst layer, the problem of poor bonding between the membrane and the electrode caused by different kind of materials arises strikingly. From the viewpoint of securing a long-term reliability of fuel cells and, further, from the viewpoint of enhancing power generation efficiency, a method for forming good membrane-electrode bonding interfaces is important, and development of a membrane-electrode assembly having low interface resistance between the membrane and the electrode is desired.

As a method for improving bonding properties between the electrolyte membrane and the electrodes, it is proposed, for example, to put an ion conductor intermediate layer having proton conductivity between the layers of the electrolyte membrane and the electrode(s) (Patent Document 1). By using the ion conductor intermediate layer being softer than the electrolyte membrane and the electrode(s), the ion conductor is dug into the uneven electrode surface to enhance bonding properties. As another example, a method to make interface resistance smaller by making electron-conductive particles present between the layers of the electrolyte membrane and the electrode(s) is proposed (Patent Document 2). It is disclosed to enlarge the surface area of bonding interfaces and reduce interface resistance by forming an uneven structure at the interface part of the electrolyte membrane and the electrode(s). As a still another example, a method for improving bonding properties between the electrolyte membrane and the electrode(s) by making an intermediate layer comprising the same electrolyte as the electrolyte membrane and a carbon material composing an electrode catalyst layer (electron-conductive particles) present between the layers of an electrolyte membrane and an electrode, and preventing the membrane from damage and, at the same time, relieving stress applied to the membrane is proposed (Patent Document 3).

Patent Document 1: JP 2000-195527 A
Patent Document 2: JP 8-64221 A
Patent Document 3: JP 2005-190749 A

DISCLOSURE OF INVENTION

Problems to be Solved by the Invention

Both of the method of Patent Document 1 and the method of Patent Document 2 aim to heighten power generation efficiency by putting intermediate layer(s) between the electrolyte membrane and the electrode(s) and thereby substantially enlarging the bonding area of the electrolyte membrane and the electrode(s). The method of Patent Document 3 does not aim to improve interface resistance between the electrolyte membrane and the electrode(s) but aims to improve mechanical bonding properties. The present invention also puts intermediate layer(s) between the electrolyte membrane and the electrode(s), but aims to make interface resistance smaller and heighten power generation efficiency by making a design so that parts bearing ion conduction in the intermediate layer(s) can efficiently contact with the electrolyte membrane and the electrode(s), and is utterly different from Patent Documents 1 to 3 in the point aimed at and methods.

The present invention aims to provide a membrane-electrode assembly and a polymer electrolyte fuel cell both of which are economical, environment-friendly, good in moldability, small in membrane-electrode interface resistance, and excellent in power generation efficiency.

Means for Solving the Problems

The present invention solving the above problems relates to a membrane-electrode assembly for polymer electrolyte fuel cells comprising a polymer electrolyte membrane and two gas diffusion electrodes being bonded to the membrane so that the membrane can be between them, in which assembly each gas diffusion electrode is comprised of an electrode catalyst layer and a gas diffusion layer, intermediate layer(s) being an ion conductor is/are present between at least one of the electrode catalyst layers and the polymer electrolyte membrane, the ion conductor mainly comprises a block copolymer comprising a polymer block (A) having ion-conductive groups and a polymer block (B) having no ion-conductive group, both polymer blocks phase-separate from each other, polymer block (A) forms a continuous phase, and the contact part(s) of the intermediate layer(s) with the polymer electrolyte membrane and the contact part(s) of the intermediate layer(s) with the electrode catalyst layer(s) are comprised or composed of polymer block (A) having ion-conductive groups.

By applying the intermediate layer(s) having a controlled ion channel structure of the invention, the bonding state between the membrane and the electrode(s) is improved and the interface resistance of between the membrane and the electrode(s) is reduced, and, thereby, power generation efficiency is enhanced as shown, for example, by that the electric resistance of the membrane-electrode assembly is reduced to enhance output.

In the intermediate layer(s) having such a structure, since polymer block (A) having ion-conductive groups in the block copolymer forms a continuous phase, ion conductivity in the intermediate layer(s) is good, and, further, since the contact part(s) of the intermediate layer(s) with the polymer electrolyte membrane and the contact part(s) of the intermediate layer(s) with the electrode catalyst layer(s) are comprised or composed of polymer block (A) having ion-conductive groups, it is possible to form ion paths efficiently. Further, since polymer block (B) having no ion-conductive group is present, the water resistance of the intermediate layer(s) is heightened, and, thereby, it is possible to prevent such a situation that the block copolymer forming the intermediate layer(s) is gradually eluted out of the cell system by moisture contained in the reaction gases during power generation, water formed at the oxygen electrode and the like, and, thereby, the membrane-electrode assembly is deteriorated.

In the block copolymer, it is preferred that the repeating unit constituting polymer block (A) is an aromatic vinyl compound unit, and polymer block (B) is a rubber-like polymer block (B1). Since the rubber-like polymer block has flexible structure, the block copolymer takes on elasticity and becomes flexible as a whole, and in preparation of membrane-electrode assemblies and polymer electrolyte fuel cells, moldability (assembling properties, bonding properties, fastening properties, etc.) is improved.

It is also preferred that polymer block (B) comprises polymer block (B1), and a structure-holding polymer block (B2). By adding polymer block (B2), it is possible to reduce the possibility that the continuity of the ion channels and, further, the durability of the membrane-electrode assembly are spoiled due to change of phase separation structure.

It is possible to use any of cation-conductive groups and anion-conductive groups as the ion-conductive group, but a cation-conductive group selected from a sulfonic acid group and a phosphonic acid group and alkali metal salts and ammonium salts of them is preferred, and a cation-conductive group selected from a sulfonic acid group and alkali metal salts and ammonium salts thereof is further preferred.

An ion conductor forming the intermediate layer(s) can be prepared by removing the aqueous dispersion medium from a dispersion wherein the block copolymer and optional various additive(s) is/are dispersed in an aqueous dispersion medium so that the particle size of the block copolymer can be 1 μm or less. By adjusting the particle size of the block copolymer to 1 μm or less, it is possible to enlarge the contact area among the block copolymers themselves and thus heighten the continuity of polymer block (A) having ion-conductive groups. When the particle size of the copolymer is more than 1 μm, uneven structure is formed due to the particle size of the copolymer at the bonding parts of the intermediate layer(s) and the electrolyte membrane or at the bonding parts of the intermediate layer(s) and the electrode catalyst layer, and, thereby, it becomes difficult to form ion paths efficiently at the bonding parts and it is impossible to reduce membrane-electrode interface resistance. By using an aqueous dispersion medium, namely water or a solvent mainly comprising water, the copolymer phase-separates so that polymer block (B) having no ion-conductive group can be an inner layer and polymer block (A) having ion-conductive groups can be an outer layer, and, as a result, the contact parts of the block copolymers themselves come to be comprised or composed of polymer block (A) having ion-conductive groups, and the bonding parts of the intermediate layer(s) and the electrolyte membrane(s) and the bonding parts of the intermediate layer(s) and the electrode catalyst layer come to be comprised or composed of polymer block (A).

The invention also relates to a fuel cell using the above membrane-electrode assembly.

Effect of the Invention

The membrane-electrode assembly and polymer electrolyte fuel cell of the invention are economical, environment-friendly, good in moldability, small in membrane-electrode interface resistance and excellent in power generation efficiency.

BRIEF DESCRIPTION OF THE DRAWINGS

In FIG. 1 and the following FIG. 2 to FIG. 4, the symbols 1 and 3 are polymer blocks (A) having ion-conductive groups, the symbols 2 and 4 are polymer blocks (B) having no ion-conductive group, the symbol 5 is the electrode catalyst layer, the symbol 6 is the intermediate layer, and the symbol 7 is the electrolyte membrane.

BEST MODE FOR CARRYING OUT THE INVENTION

Figure 1:
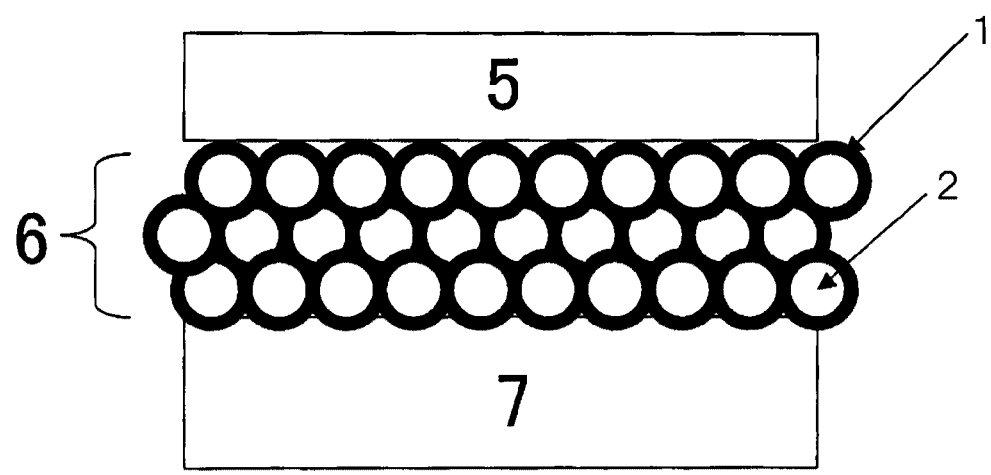
FIG. 1 is a schematic view showing the structure of the intermediate layer arranged in the membrane electrode assembly of the invention.

The invention is described in detail below. FIG. 1 is a schematic view showing the structure of the intermediate layer arranged in the membrane-electrode assembly of the invention. As shown in the view, the intermediate layer comprises an ion conductor, the block copolymer as a main constituent of the ion conductor phase-separates into polymer block (A) having ion-conductive groups and polymer block (B) having no ion-conductive group, polymer block (A) having ion-conductive groups forms a continuous phase, and the contact part(s) of the intermediate layer(s) with the polymer electrolyte membrane and the contact part(s) of the intermediate layer(s) with the electrode catalyst layer(s) are comprised or composed of polymer block (A) having ion-conductive groups.

The block copolymer used in the invention is such a copolymer that it comprises polymer block (A) having ion-conductive groups and polymer block (B) having no ion-conductive group, and both blocks mutually phase-separate. As an example of such copolymer, there can be used copolymers described in WO 2006/068279 A1. The block copolymer used in the invention is described in detail below.

As monomers capable of forming the repeating unit of polymer block (A), there is no particular restriction, and there can, for example, be mentioned aromatic vinyl compounds, conjugated dienes having 4 to 8 carbon atoms (1,3-butadiene, isoprene, etc.), alkenes having 2 to 8 carbon atoms (ethylene, propylene, isobutylene, etc.), (meth)acrylic esters (methyl (meth)acrylate, ethyl (meth)acrylate, butyl (meth)acrylate, etc.), vinyl esters (vinyl acetate, vinyl propionate, vinyl butyrate, vinyl pivalate, etc.); vinyl ethers (methyl vinyl ether, isobutyl vinyl ether, etc.), etc., but, in view of easiness of introduction of an ion-conductive group, aromatic vinyl compounds are preferred. As examples of aromatic vinyl compounds, styrene, α-methylstyrene, styrene wherein 1 to 3 hydrogen atom(s) bonded to the benzene ring is/are replaced with alkyl group(s) each having 1 to 4 carbon atoms (methyl group(s), ethyl group(s), n-propyl group(s), isopropyl group(s), n-butyl group(s), isobutyl group(s), tert-butyl group(s), etc.) (p-methylstyrene, etc.), vinylnaphthalene, vinylanthracene, vinylpyrene, vinylpyridine and so on. It is preferred in view of easiness of introduction of an ion-conductive group that the aromatic vinyl compound unit is a styrene unit and/or an α-methylstyrene unit. It is also preferred in view of heightening stability against oxidation by hydrogen peroxide formed due to side reaction of electrode reaction and/or hydroxyl radicals derived from hydrogen peroxide that the aromatic vinyl compound unit has a structure having no tertiary carbon, and, specifically, is an α-methylstyrene unit.

When the repeating unit of polymer block (A) is an aromatic vinyl compound unit, polymer block (A) can contain one or plural other monomer units. As such other monomer units, there can, for example, be mentioned conjugated diene units each having 4 to 8 carbon atoms (1,3-butadiene unit, isoprene unit, etc.), (meth)acrylic ester units (methyl (meth)acrylate unit, ethyl (meth)acrylate unit, butyl (meth)acrylate unit, etc.), alkene units each having 2 to 8 carbon atoms (ethylene unit, propylene unit, isobutene unit, etc.), etc. In the above, the conjugated diene unit is preferably one wherein its 30% by mol or more is hydrogenated, more preferably one wherein its 50% by mol or more is hydrogenated and still more preferably one wherein its 80% by mol or more is hydrogenated. In view of giving the ion-conductor sufficient oxidation stability, the proportion of the aromatic vinyl compound unit in polymer block (A) is preferably 80% by mass or more and more preferably 90% by mass or more. The form of the copolymerization of the aromatic vinyl compound with the other monomer is preferably random copolymerization.

The molecular weight of polymer block (A) in such a state that no ion-conductive group is introduced is appropriately chosen depending on the nature and state, desired performance, other polymer components, etc. of the ion conductor. When the molecular weight is large, there is a tendency that, due to rise of viscosity, it becomes difficult to obtain an aqueous dispersion of the block copolymer having a uniform average particle size, and, further, the dynamic characteristics such as tensile strength of the ion conductor becomes higher, and when the molecular weight is small, there is a tendency that it becomes difficult that the block copolymer constituting the ion conductor forms phase separation structure, and, thus, it is important to appropriately choose the molecular weight in accordance with necessary performance. Usually, the molecular weight is preferably chosen between 100 and 1,000,000, and more preferably chosen between 1,000 and 100,000, as number average molecular weight in terms of polystyrene.

The block copolymer has, besides polymer block (A), polymer block (B) having no ion-conductive group. If an ion-conductive group is introduced into polymer block (A) in a high content, water resistance is heightened by having polymer block (B), and it is possible to prevent the ion conductor binder from flowing out during power generation. Polymer block (B) is not particularly restricted so long as it phase-separates from polymer block (A) and has water resistance, but it is preferred that polymer block (B) is a rubber-like polymer block (B1). By that polymer block (B) has flexible structure, the block copolymer takes on elasticity and becomes flexible as a whole, and in preparation of membrane-electrode assemblies and polymer electrolyte fuel cells, moldability (assembling properties, bonding properties, fastening properties, etc.) is improved. Such flexible polymer block (B1) is a so-called rubber-like polymer block whose glass transition point or softening point is 50° C. or less, preferably 20° C. or less, more preferably 10° C. or less.

As the repeating unit constituting polymer block (B1), there can be mentioned conjugated diene units each having 4 to 8 carbon atoms (1,3-butadiene unit, isoprene unit, etc.), alkene units each having 2 to 8 carbon atoms (isobutylene unit, etc.), etc. Monomers giving these units can be used alone or in a combination of two or more. When two or more are copolymerized, the form of the copolymerization can be random copolymerization, block copolymerization, graft copolymerization or tapered copolymerization. When a monomer used in the (co)polymerization has two carbon-carbon double bonds, any of them can be used in the (co)polymerization, and in the case of a conjugated diene either of 1,2-bond and 1,4-bond can be used in the (co)polymerization, and so long as the glass transition point or softening point is 50° C. or less, there is no particular restriction on the proportion between 1,2-bond and 1,4-bond.

When the repeating units constituting polymer block (B1) have a carbon-carbon double bond as in conjugated diene units, it is preferred that 30% by mol or more of the carbon-carbon double bonds are hydrogenated, it is further preferred that 50% by mol or more thereof are hydrogenated, and it is still further preferred that 80% by mol or more thereof are hydrogenated, in view of enhancement of the power generation performance, heat deterioration resistance, etc. of membrane-electrode assemblies using the intermediate layer of the invention. The hydrogenation proportion of the carbon-carbon double bonds can be calculated according to a method generally used, for example, a method of measuring iodine value, $^1$H-NMR measurement, or the like.

Polymer block (B1) can contain, besides the above monomer unit(s) [conjugated diene unit(s) having 4 to 8 carbon atoms (1,3-butadiene unit(s), isoprene unit(s), etc.), alkene unit(s) having 2 to 8 carbon atoms (isobutylene unit(s), etc.), etc.], another monomer unit, for example a unit of an aromatic vinyl compound such as styrene or vinylnaphthalene or a halogen-containing vinyl compound such as vinyl chloride, so long as it does not spoil the purposes of polymer block (B1) of giving elasticity to the block copolymer. In this case, the form of the copolymerization of the above monomer unit(s) with another monomer unit is preferably random copolymerization. The proportion of the above monomer unit(s) [conjugated diene unit(s) having 4 to 8 carbon atoms (1,3-butadiene unit(s), isoprene unit(s), etc.), alkene unit(s) having 2 to 8 carbon atoms (isobutylene unit(s), etc.), etc.] in polymer block (B1) is preferably 50% by mass or more, more preferably 70% by mass or more, still more preferably 90% by mass or more, based on the total of the above monomer unit(s) and another monomer unit.

The meaning of the expression that polymer block (B1) has no ion-conductive group is that it substantially has no ion-conductive group, and, if a trace amount of ion-conductive groups are incorporated into polymer block (B1) in the course of preparation of the block copolymer, it is within the invention. This applies to polymer block (B2) described later.

The mass ratio of polymer block (A) to polymer block (B1) in the copolymer is not particularly restricted so long as the water resistance of the ion conductor is fulfilled, and is preferably 95:5 to 5:95, more preferably 90:10 to 10:90 and still more preferably 50:50 to 10:90.

The arrangement of polymer block (A) and polymer block (B1) in the block copolymer is not particularly restricted, and the block copolymer can be an A-B1 diblock copolymer, an A-B1-A triblock copolymer, a B1-A-B1 triblock copolymer, an A-B1-A-B1 tetrablock copolymer, an A-B1-A-B1-A pentablock copolymer, a B1-A-B1-A-B1 pentablock copolymer, etc. These block copolymers can be used alone or in a combination of two or more.

The block copolymer used in the invention can contain, besides polymer block (A) and polymer block (B1), another polymer block (B2) which is different from these blocks, phase-separates from these blocks and has no ion-conductive group. Namely, polymer block (B) can comprise polymer block (B1) or comprise polymer block (B1) and polymer block (B2). As a repeating unit constituting polymer block (B2), there can be mentioned as a specific example an aromatic vinyl compound unit described in the explanation of polymer block (A). Among such aromatic vinyl compound units constituting polymer block (B2), preferred is an aromatic vinyl compound unit which is hard to substitute with an ion-conductive group compared to the aromatic vinyl compound unit in polymer block (A), and, for example, when the aromatic vinyl compound unit(s) in polymer block (A) is/are a styrene unit and/or an α-methylstyrene unit, it is preferred that the aromatic vinyl compound unit constituting polymer block (B2) is a styrene unit wherein 1 to 3 hydrogen atom(s) bonded to the benzene ring is/are replaced with alkyl group(s) having 1 to 4 carbon atoms (e.g., t-butylstyrene unit).

When the block copolymer comprises polymer block (A), polymer block (B1) and polymer block (B2), the arrangement of these polymer blocks is not particularly restricted, and the block copolymer can be an A-B1-B2 triblock copolymer, an A-B1-B2-A tetrablock copolymer, an A-B1-A-B2 tetrablock copolymer, a B1-A-B1-B2 tetrablock copolymer, an A-B1-B2-B1 tetrablock copolymer, a B2-B1-B2-A tetrablock copolymer, an B2-A-B1-A-B2 pentablock copolymer, a B2-B1-A-B1-B2 pentablock copolymer, an A-B2-B1-B2-A pentablock copolymer, an A-B1-B2-B1-A pentablock copolymer, an A-B2-B1-A-B2 pentablock copolymer, an A-B1-B2-A-B1 pentablock copolymer, an A-B1-B2-A-B2 pentablock copolymer, an A-B1-B2-B1-B2 pentablock copolymer, an A-B1-A-B2-B1 pentablock copolymer, a B1-A-B1-A-B2 pentablock copolymer, a B1-A-B1-B2-A pentablock copolymer, a B1-A-B1-B2-B1 pentablock copolymer, a B2-A-B2-B1-B2 pentablock copolymer, etc. Among them are preferred such arrangements that shell phases are easy to form by that there are polymer blocks (A)

at both ends, for example, an arrangement wherein rubber-like polymer block (B1) is arranged at the center, polymer blocks (B2) are arranged adjacently to both sides thereof and polymer blocks (A) are arranged adjacently to both outsides of polymer block (B2), e.g. A-B2-B1-B2-A.

When polymer block (B2) is used, swelling of the ion conductor is inhibited, and it is possible to reduce the possibility that the continuity of ion channels and, further, durability of the membrane-electrode assembly are spoiled due to the swelling of the ion conductor during power generation. Furthermore, in the step to form an intermediate layer by removing the aqueous dispersion medium from an aqueous dispersion wherein the block copolymer is dispersed, it is possible, by polymer block (B2), to reduce the possibility that the phase separation structure of the ion conductor which has been formed in the dispersion is changed.

When the block copolymer used in the invention contains polymer block (B2), the proportion of polymer block (B2) in the block copolymer is preferably less than 75% by mass, more preferably less than 70% by mass and still more preferably less than 60% by mass. Further, in view of making polymer block (B2) display the function as mentioned above, the proportion of polymer block (B2) in the block copolymer is preferably 10% by mass or more, more preferably 20% by mass or more and still more preferably 25% by mass or more. When the block copolymer contains polymer block (B2), the ratio by mass of the total of polymer block (A) and polymer block (B2) to polymer block (B1) is preferably 20:80 to 80:20, more preferably 25:75 to 75:25 and still more preferably 30:70 to 70:30 in view of performances needed, flexibility and elasticity and, further, from the viewpoint of giving good moldability in preparation of membrane-electrode assemblies and polymer electrolyte fuel cells.

The number average molecular weight of the block copolymer used in the invention, in a state that ion-conductive groups are not introduced, is not particularly restricted, but, usually, is preferably 10,000 to 2,000,000, more preferably 15,000 to 1,000,000 and still more preferably 20,000 to 500,000 as number average molecular weight in terms of polystyrene.

The block copolymer used in the invention has ion-conductive groups on polymer block (A). When ion conductivity is referred to in the invention, the ion includes a cation and an anion, and the cation includes a proton, etc. and the anion includes a hydroxide ion, etc. As the ion-conductive group, either of a cation-conductive group and an anion-conductive group can be used, but the cation-conductive group is preferably used. The cation-conductive group is not particularly restricted so long as it is such a group that a membrane-electrode assembly prepared using the ion conductor can display sufficient cation conductivity, but a sulfonic acid group or a phosphonic acid group or their salts represented by —SO$_3$M or —PO$_3$HM wherein M represents a hydrogen atom, an ammonium ion or an alkali metal ion, can be used preferably. In the above, as the alkali metal ion, there can be mentioned a sodium ion, a potassium ion, a lithium ion, etc. As the cation-conductive group, a carboxyl group or a salt thereof can also be used. The anion-conductive group is not particularly restricted so long as it is such a group that a membrane-electrode assembly prepared using the ion conductor can display sufficient anion conductivity, and there can be mentioned groups as shown below.

(1)

(2)

(3)

(4)

(5)

(6)

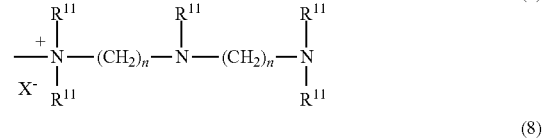

(7)

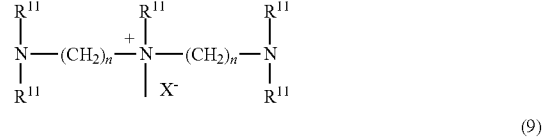

(8)

(9)

(10)

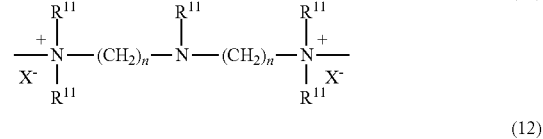

(11)

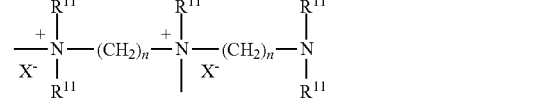

(12)

-continued

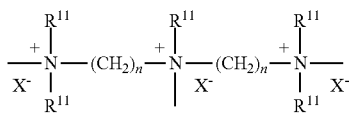

(13)

In the above formulae, $R^1$ to $R^3$ represent respectively independently hydrogen atoms or alkyl groups having 1 to 8 carbon atoms, $R^4$ to $R^9$ and $R^{11}$ represent respectively independently hydrogen atoms, methyl groups or ethyl groups, $R^{19}$ represents a methyl group or an ethyl group, X— represents a hydroxide ion or an acid anion, m represents an integer of 2 to 6, and n represents 2 or 3.

In the above formulae, polyvalent groups bond polymer blocks (A) themselves among block copolymers or inside the block copolymer.

The ion-conductive groups preferably exist at the side chains or free ends of the aromatic vinyl polymer block (A).

The amount of the ion-conductive group introduced is appropriately selected depending on performances needed for the block copolymer obtained and the like, but, in order to display sufficient ion conductivity to use the block copolymer as an intermediate layer, usually, the amount of ion-conductive groups introduced is preferably such an amount that the ion exchange capacity of the block copolymer is 0.30 meq/g or more, and more preferably such an amount that it is 0.40 meq/g or more. As to the upper limit of the ion exchange capacity of the block copolymer, there is no particular restriction, but, usually, it is preferred that the ion exchange capacity is 3 meq/g or less. The proportion of the monomer unit having an ion-conductive group in polymer block (A) is preferably 10% by mol or more, more preferably 30% by mol or more and still more preferably 50% by mol or more. The form of copolymerization of the monomer unit having an ion-conductive group with other monomer unit(s) is preferably random copolymerization for preventing polymer block (A) from phase separating.

The block copolymer used in the invention can be prepared according to the preparation process described in WO 2006/068279 A1 mentioned previously, or according to a similar process thereto.

In the intermediate layer(s) arranged at the membrane-electrode bonding part(s) in the membrane-electrode assembly of the invention, particles themselves of the block copolymer come in contact with one another through polymer block (A) having ion-conductive groups, and, at the same time, the contact part(s) of the intermediate layer(s) with the electrolyte membrane and the contact part(s) of the intermediate layer(s) with the electrode catalyst layer(s) are comprised or composed of polymer block (A) having ion-conductive groups, and, in order to give such a structure, it is preferred that the block copolymer take such a core-shell structure that the inner layer (core phase) is polymer block (B) and the outer layer (shell phase) is polymer block (A). This core-shell structure is usually spherical. By taking the core-shell structure, polymer block (A) having ion-conductive groups can form a continuous phase efficiently, the intermediate layer is excellent in inner ion conductivity, it is possible to form ion paths easily at the contact part(s) of the intermediate layer(s) with the electrolyte membrane and the contact part(s) of the intermediate layer(s) with the electrode catalyst layer(s), and, as a result, it is possible to reduce membrane-electrode interface resistance and enhance power generation efficiency.

The ion conductor used in the invention mainly comprises the above-mentioned block copolymer.

The ion conductor of the invention can contain, under such a condition that the effects of the invention are not spoiled, various additives, for example, softening agents, stabilizers, light stabilizers, antistatic agents, mold release agents, flame retardants, foaming agents, pigments, dyes, brighteners, carbon fiber, inorganic fillers, etc., alone respectively or in a combination of two or more.

As the softening agent, there can be mentioned petroleum softening agents such as paraffin-, naphthene- or aroma-process oils; paraffins; vegetable oil softening agents; plasticizers; etc.

The stabilizers include phenol-type stabilizers, sulfur-type stabilizers, phosphorus-type stabilizers, and, as specific examples, there can be mentioned phenol-type stabilizers such as 2,6-di-t-butyl-p-cresol, pentaerythrityl tetrakis[3-(3,5-di-t-butyl-4-hydroxyphenyl)propionate], 1,3,5-trimethyl-2,4,6-tris(3,5-di-t-butyl-4-hydroxybenzyl)benzene, octadecyl-3-(3,5-di-t-butyl-4-hydroxyphenyl)propionate, triethylene glycol bis[3-(3-t-butyl-5-methyl-4-hydroxyphenyl)propionate], 2,4-bis(n-octylthio)-6-(4-hydroxy-3,5-di-t-butylanilino)-1,3,5-triazine, 2,2-thio-diethylene bis[3-(3,5-di-t-butyl-4-hydroxyphenyl)propionate], N,N'-hexamethylenebis(3,5-di-t-butyl-4-hydroxy-hydrocinnamide), 3,5-di-t-butyl-4-hydroxy-benzylphosphonate diethyl ester, tris-(3,5-di-t-butyl-4-hydroxybenzyl)isocyanurate and 3,9-bis{2-[3-(3-t-butyl-4-hydroxy-5-methylphenyl)propionyloxy]-1,1-dimethylethyl}-2,4,8,10-tetraoxaspiro[5,5]undecane; sulfur-type stabilizers such as pentaerythrityl tetrakis(3-laurylthiopropionate), distearyl 3,3'-thiodipropionate, dilauryl 3,3'-thiodipropionate and dismyristyl 3,3'-thiodipropionate; phosphorus-type stabilizers such as tris(nonylphenyl)phosphite, tris(2,4-di-t-butylphenyl)phosphite, distearyl pentaerythritol diphosphite, bis(2,6-di-t-butyl-4-methylphenyl)pentaerythritol diphosphite; etc.

As specific examples of the inorganic fillers, there can be mentioned talc, calcium carbonate, silica, glass fiber, mica, kaolin, titanium oxide, montmorillonite, alumina, etc.

As to the addition time of various optional additives as mentioned above which can be incorporated into the ion conductor, it is possible to previously mix the block copolymer and the additives, and it is also possible to add the additives when a dispersion of the block copolymer in a dispersion medium mainly comprising water is prepared.

The content of the block copolymer in the ion conductor used in the invention is preferably 50% by mass or more, more preferably 70% by mass or more and further more preferably 90% by mass or more, in view of ion conductivity.

In the intermediate layer arranged at the membrane-electrode bonding part(s) in the membrane-electrode assembly of the invention, particles themselves of the block copolymer come in contact with one another through polymer block (A) having ion-conductive groups, and, at the same time, the contact part(s) of the intermediate layer(s) with the electrolyte membrane and the contact part(s) of the intermediate layer(s) with the electrode catalyst layer(s) are comprised or composed of polymer block (A) having ion-conductive groups, and, in order to give such a structure, it is preferred that the block copolymer take such a form that polymer block (B) having no ion-conductive group phase-separates toward the inside and polymer block (A) having ion-conductive groups phase-separates toward the outside (namely, core-shell structure). Methods of inducing such a form are not particularly restricted. As an example, there can be mentioned (1) a method of removing the dispersion medium from a dispersion of the block copolymer in a dispersion medium mainly comprising water; or the like. As the dispersion in this method, an emulsion or a suspension is preferred, and the emulsion is further preferred.

In order to enlarge the contact area among the ion conductor themselves, the particle size of the block copolymer in the dispersion in the method (1) is preferably 1 μm or less, more preferably 0.5 μm or less and still more preferably 0.1 μm or less. When the particle size is 1 μm or less, reduction of membrane-electrode interface resistance is remarkable, and cell output can be enhanced, compared to cases of particle sizes larger than that. The lower limit of the particle size of the block copolymer in the dispersion is not particularly restricted, but, in view of adjusting it to a particle size necessary for that the block copolymer phase-separates into a phase having ion-conductive groups and a phase having no ion-conductive group, the particle size is preferably 10 nm or more and more preferably 40 nm or more. The particle size in the dispersion can be measured by methods generally used, for example, a dynamic light scattering method or the like.

Processes of obtaining a dispersion of the block copolymer in the method (1) are not particularly restricted, and there can be mentioned a process of emulsifying the block copolymer in an aqueous dispersion medium, a process of obtaining such a dispersion by liquid phase polymerization such as emulsion polymerization or suspension polymerization, etc., but, the process of emulsifying the block copolymer is preferred.

As methods of emulsifying the block copolymer, there can be used a direct emulsification method comprising dispersing a melt of the block copolymer into an aqueous dispersion medium at temperatures higher than the melting point of the block copolymer. The aqueous dispersion medium means water or a solvent mainly comprising water. As another method, there can be used a solution inversion emulsification method comprising dissolving the block copolymer in an organic solvent and then dispersing the solution in an aqueous dispersion medium. As organic solvents used for dissolution of the block copolymer and organic solvents mixed with water used as a dispersion medium, there can be exemplified alcohols such as methanol, ethanol, propanol and isopropanol halogenated hydrocarbons such as methylene chloride; aromatic hydrocarbons such as toluene, xylene and benzene; straight-chain aliphatic hydrocarbons such as hexane and heptane; cyclic aliphatic hydrocarbons such as cyclohexane; ethers such as tetrahydrofuran; and, further, acetonitrile, nitromethane, dimethyl sulfoxide, N-methylpyrrolidone, N,N-dimethylformamide, N,N-dimethylacetamide, etc. These solvents can be used each alone or in a combination of two or more. When an organic solvent is used in dispersion of the copolymer, it is preferred to remove the organic solvent after the dispersion was made. The removal of the organic solvent can, for example, be made by utilization of azeotropy with water, using a reaction vessel equipped with a stirrer and a condenser, an extruder equipped with a vent, a rotary evaporator or the like. The removal of the organic solvent can be made either under atmospheric pressure or under reduced pressure.

Dispersion of the block copolymer can be made using a vessel equipped with a stirring means. The stirring means is not particularly restricted, but, in view of generating large shearing force, turbine stirrers, colloid mills, homomixers and homogenizers are preferred. The dispersion can also be made using a line mixer equipped with a movable stirring apparatus, an immovable line mixer (Static Mixer, trade name, made by Noritake Co., Ltd.) or the like. It is further possible to conduct dispersion once by a stirring means as mentioned above and, then, conduct a treatment of finely dispersing the copolymer using a high pressure homogenizer (Manton Gaulin, trade name, made by APV GAULIN Inc.; Microfluidizer, trade name, Mizuho Industries Co., Ltd.; Nanomizer, trade name, made by Yoshida Kikai Kogyo Co., Ltd.; etc.) or the like.

When the copolymer is dispersed in an aqueous dispersion medium, a surfactant can be used as an emulsifier or dispersant, and there can be used nonionic surfactants, anionic surfactants, etc. The use amount of the surfactant is usually in the range of 0.1 to 40 parts by mass and preferably in the range of 0.1 to 20 parts by mass based on 100 parts by mass of the block copolymer used, but it is desirable to use it at a necessary minimum amount.

As the nonionic surfactants, there can, for example, be mentioned polyethylene glycol-type nonionic surfactants, polyhydric alcohol-type nonionic surfactants, etc. As the polyethylene glycol-type nonionic surfactants, there can, for example, be mentioned ethylene oxide adducts of higher alcohols, ethylene oxide adducts of alkylphenols, ethylene oxide adducts of fatty acids, ethylene oxide adducts of polyhydric alcohol fatty acid esters, ethylene oxide adducts of higher alkylamines, ethylene oxide adducts of fatty acid amides, ethylene oxide adducts of fats and oils, ethylene oxide adducts of polypropylene glycols, etc. As the polyhydric alcohol-type nonionic surfactants, there can, for example, be mentioned glycerol fatty acid esters, pentaerythritol fatty acid esters, sorbitol fatty acid esters, sorbitan fatty acid esters, sucrose fatty acid esters, polyhydric alcohol alkyl ethers, alkanolamine fatty acid amides, etc.

As the anionic surfactants, there can, for example, be mentioned primary higher fatty acid salts, secondary higher fatty acid salts, primary higher alcohol sulfate esters, secondary higher alcohol sulfate esters, primary higher alkylsulfonate salts, secondary higher alkylsulfonate salts, higher alkyldisulfonate salts, sulfonated higher fatty acid salts, alkoxysulfonyl-higher fatty acid salts, higher fatty acid ester-sulfonate salts, salts of sulfonated higher alcohol ethers, alkylbenzenesulfonate salts, alkylphenolsulfonate salts, alkylnaphthalenesulfonate salts, alkylbenzimidazolesulfonate salts, alkyl phosphate salts, salts of phosphonated alkyl ethers, salts of phosphonated alkyl allyl ethers, etc.

These surfactants can be used alone or in a combination of two or more.

There is no particular restriction on methods for formation of an intermediate layer from the dispersion of the block copolymer, and known methods such as printing methods and spraying methods can be adopted.

The membrane-electrode assembly of the invention is now described. As to preparation processes of a membrane-electrode assembly having intermediate layer(s), there is no particular restriction, and, for example, there can be used a process which comprises forming intermediate layer(s) on the surface(s) of an electrolyte membrane and bonding gas diffusion electrode(s) so that the intermediate layer(s) and the electrode catalyst layer(s) can be bonded; a process which comprises forming intermediate layer(s) on the surface(s) of the electrode catalyst layer(s) composing gas diffusion electrode(s) and bonding an electrolyte membrane so that the intermediate layer(s) and the electrolyte membrane can be bonded; a process which comprises forming intermediate layer(s) on the surface(s) of an electrolyte membrane, forming electrode catalyst layers on both sides of the electrolyte membrane and compression-bonding gas diffusion layers on the respective electrode catalyst layers by a hot press or the like; etc. As to processes for forming intermediate layer(s) on the surface(s) of the electrolyte membrane or the electrode catalyst layer(s), there is no particular restriction, and there can, for example, be mentioned a process which comprises removing the dispersion medium from the above-mentioned dispersion containing the block copolymer, and as processes for removal of the dispersion medium, there can be mentioned a process which comprises applying the dispersion onto the surface(s) of the electrolyte membrane or the electrode catalyst layer(s) and, at the same time or thereafter, evaporating the dispersion medium by air drying, drying by heating, drying under reduced pressure, drying in a stream of air or the like. There can, further, be mentioned a process which comprises forming an intermediate layer on a substrate film such as one made of polytetrafluoroethylene (PTFE) and removing the dispersion medium, transferring the intermediate layer on the substrate film onto the surface of the electrolyte membrane or the electrode catalyst layer by compression bonding, and peeling away the substrate film; a process which comprises applying the dispersion onto the surface of the electrode catalyst layer or the electrolyte membrane, and removing the dispersion medium seeping from its back; etc. The intermediate layer can be used on either or both of the membrane-electrode bonding parts.

As the polymer electrolyte membrane constituting the membrane-electrode assembly, there can, for example, be used an electrolyte membrane comprising an existing perfluorocarbonsulfonic polymer such as "Nafion" (registered trade mark, made by Du Pont Co.) or "Gore-select" (registered trade mark, made by Gore Co.), an electrolyte membrane comprising a sulfonated polyether sulfone or a sulfonated polyether ketone, an electrolyte membrane comprising a polybenzimidazole impregnated with phosphoric acid or sulfuric acid, etc. It is also possible to make an electrolyte membrane of the block copolymer constituting the ion conductor to be used as an intermediate layer constituting the membrane-electrode assembly of the invention. For further heightening adhesion between the polymer electrolyte membrane and the intermediate layer, it is preferred to use an electrolyte membrane made of the same material as that of the block copolymer used in the intermediate layer constituting the membrane-electrode assembly of the invention, and, namely, although a polymer used in the polymer electrolyte membrane and a block copolymer used in the intermediate layer may be the same or different, it is preferred that both of them fall within the definition of block copolymers used in the intermediate layer. When a block copolymer used in the intermediate layer is used as a polymer electrolyte membrane and the block copolymer contains polymer block (B2), it is preferred in view of its structure-holding properties that the block copolymer is one having polymer block (B2) at both ends, for example, B2-A-B1-A-B2 or the like.

There is no particular restriction on preparation of an electrode catalyst layer constituting the above-mentioned membrane-electrode assembly, and known processes can be applied, and, for example, it is possible to form a composite of an electrode catalyst layer and the gas diffusion layer by applying a catalyst paste containing an ion-conductive binder onto a gas diffusion layer according to a printing method or a spraying method and drying it. The catalyst paste can be prepared by mixing and dispersing an ion-conductive binder and catalyst particles into a solvent such as water or an alcoholic solvent. At the time, it is possible to incorporate a water repellent material such as polytetrafluoroethylene, polyhexafluoropropylene or a tetrafluoroethylene-hexafluoropropylene copolymer or the like in a small amount in such a range that the effects of the invention are not spoiled. By inclusion of a water repellent material, it is possible to enhance water repellency of the resulting electrode catalyst layer and promptly discharge water or the like formed during power generation.

The content of the ion-conductive binder in the catalyst paste can appropriately be determined so that the resulting electrode catalyst layer can have desired characteristics, but the content is preferably such that the mass of the ion-conductive binder is 0.1 to 3.0 times that of the catalyst metal, more preferably such that the mass of the ion-conductive binder is 0.3 to 2.0 times that of the catalyst metal, and still more preferably such that the mass of the ion-conductive binder is 0.5 to 1.5 times that of the catalyst metal. In view of ion conductivity in the resulting electrode catalyst layer, the content is preferably such that the mass of the ion-conductive binder is 0.1 times or more that of the catalyst metal, and in view of securing diffusion paths of reactants in the resulting electrode catalyst layer, the content is preferably such that the mass of the ion-conductive binder is 3.0 times or less that of the catalyst metal. Further, in the catalyst paste, the total concentration of solid matter such as the catalyst particles and the ion-conductive binder is preferably on the order of 5 to 50% by mass.

As a cation-conductive binder in the above ion-conductive binder, there can, for example, be used an ion-conductive binder comprised of an existing perfluorocarbonsulfonic acid-type polymer such as "Nafion" (registered trade mark, made by Dupont Co.) or "Gore-select" (registered trade mark, made by Gore Co.); an ion-conductive binder comprised of a sulfonated polyether sulfone or a sulfonated polyether ketone; an ion-conductive binder comprised of a polybenzimidazole impregnated with phosphoric acid or sulfuric acid; or the like. As an anion-conductive binder, there can, for example, be used an anion-conductive binder obtained by reacting polychloromethylstyrene with a tertiary amine to give a quaternary ammonium salt and, if necessary, converting it to the form of a hydroxide; or the like. It is also possible to make an ion-conductive binder of the block copolymer constituting the ion conductor used in the invention. Such an ion-conductive binder can contain the same additive as in the aforementioned ion conductor, in the same amount. For further heightening the adhesion between the intermediate layer and the electrode catalyst layer, it is preferred to use an ion-conductive binder made of the same material as that of the block copolymer used in the intermediate layer constituting the membrane-electrode assembly of the invention. Namely, although a polymer used in the ion conductive binder and the block copolymer used in the intermediate layer may be the same or different, but it is preferred that they both fall within the definition of the block copolymer used in the intermediate layer As the above-mentioned catalyst particles, there is no particular restriction, and there can be used catalyst metal fine particles such as platinum black, and particles supporting a catalyst thereon wherein a catalyst metal is supported on an electrically conductive material. As the catalyst metal, any metal can be used so long as it is a metal capable of promoting oxidation reaction of a fuel such as hydrogen or methanol and reduction reaction of oxygen, and there can, for example, be mentioned platinum, gold, silver, palladium, iridium, rhodium, ruthenium, iron, cobalt, nickel, chromium, tungsten, manganese, etc., and their alloys such as a platinum-ruthenium alloy. Among them, platinum or a platinum alloy is used in many cases. The particle size of a metal as the catalyst is, usually, 10 to 300 angstroms. As support materials, any electrically conductive materials can be used, and there can, for example, be mentioned carbon materials. As carbon materials, there can, for example, be mentioned carbon blacks such as furnace black, channel black and acetylene black, activated carbon, graphite, etc. These can be used alone or as a mixture of two or more.

The gas diffusion layer of the membrane-electrode assembly is comprised of a material having electrical conductivity and gas permeability, and as the material, there can, for example, be mentioned a porous material composed of carbon fiber such as carbon paper or carbon cloth. Such a material can be subjected to water repellent treatment for heightening water repellency. As a process for making water repellent treatment, there can, for example, be mentioned a process which comprises immersing the gas diffusion layer in a dispersion of a fluorine-type water repellent material such as polytetrafluoroethylene or the like, and heat drying the resulting gas diffusion layer in an oven or the like; or the like.

By inserting a membrane-electrode assembly obtained by a process as mentioned above between electrically conductive separator materials having both of a role of separation of the electrode chamber and a role of paths for gas supply to the electrodes, a polymer electrolyte fuel cell can be obtained. The membrane-electrode assembly of the invention can be used as a membrane-electrode assembly for polymer electrolyte fuel cells such as a pure hydrogen one using hydrogen as the fuel gas, a methanol-reforming one using hydrogen obtained by reforming methanol, a natural gas-reforming one using hydrogen obtained by reforming natural gas, a gasoline-reforming one using hydrogen obtained by reforming gasoline and a direct methanol one wherein methanol is used directly.

EXAMPLES

The invention is further specifically described below through referential examples, examples and comparative examples, but the invention is not limited by them.

Referential Example 1

Preparation of a Block Copolymer Composed of poly($\alpha$-methylstyrene) and Hydrogenated Polybutadiene In a similar process to a previously reported process (WO 02/40611), a poly($\alpha$-methylstyrene)-b-polybutadiene-b-poly($\alpha$-methylstyrene) triblock copolymer (hereinafter abbreviated as mSBmS) was synthesized. The number average molecular weight (GPC measurement, in terms of polystyrene) of the resulting mSBmS was 76,000, and the amount of the 1,4-bond determined by $^1$H-NMR measurement was 55% and the content of the $\alpha$-methylstyrene unit also determined by the $^1$H-NMR measurement was 30.0% by mass. Further, it was revealed by composition analysis through $^1$H-NMR spectrum measurement that $\alpha$-methylstyrene was not substantially copolymerized into the polybutadiene block.

A solution of the synthesized mSBmS in cyclohexane was prepared, the solution was put in a pressure proof vessel whose atmosphere had sufficiently been replaced with nitrogen, and then, hydrogenation reaction was conducted at 80° C. for 5 hours in an atmosphere of hydrogen using a Ni/Al Ziegler hydrogenating catalyst to obtain a poly($\alpha$-methylstyrene)-b-hydrogenated polybutadiene-b-poly($\alpha$-methylstyrene) triblock copolymer (hereinafter abbreviated as mSEBmS). The hydrogenation proportion of the mSEBmS was calculated by $^1$H-NMR spectrum measurement to be 99.6%.

Referential Example 2

Synthesis of Sulfonated mSEBmS

In a similar process to a previously reported process (JP 2006-210326 A), a sulfonated mSEBmS was synthesized. Specifically, first, a sulfonating reagent was prepared by reacting 21.0 ml of acetic anhydride with 9.34 ml of sulfuric acid at 0° C. in 41.8 ml of methylene chloride. Separately, 100 g of the block copolymer mSEBmS obtained in Referential example 1 was vacuum dried for 1 hour in a glass-made reaction vessel equipped with a stirrer, the inside atmosphere of the reaction vessel was replaced with nitrogen, 1,000 ml of methylene chloride was added, and the mixture was stirred at 35° C. for 4 hours to dissolve the block copolymer. After the dissolution, the sulfonating reagent was gradually added dropwise thereto over a period of 20 minutes. After stirring at 35° C. for 1 hour, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated mSEBmS. The ion exchange capacity of the sulfonated mSEBmS was 0.69 meq/g.

Referential Example 3

Preparation of a Block Copolymer Composed of Polystyrene (Polymer Block (A)), Hydrogenated Polyisoprene (Polymer Block (B1)) and Poly(4-tert-butylstyrene) (Polymer Block (B2))

In a similar process to a previously reported process (JP 2007-258162 A), a poly(4-tert-butylstyrene)-b-polystyrene-b-polyisoprene-b-polystyrene-b-poly(4-tert-butylstyrene) (hereinafter, abbreviated as tBSSIStBS) was synthesized by putting 576 ml of dehydrated cyclohexane and 1.78 ml of sec-butyllithium (1.3M-cyclohexane solution) in a 1,000-ml egg-plant type flask, adding successively 32.1 ml of 4-tert-butylstyrene, 13.5 ml of styrene, 81.6 ml of isoprene, 13.3 ml of styrene and 31.5 ml of 4-tert-butylstyrene, and polymerizing them respectively at 30° C. The number average molecular weight (GPC measurement, in terms of polystyrene) of the obtained tBSSIStBS was 94,682, and the amount of the 1,4-bond, the content of the styrene unit and the content of the 4-tert-butylstyrene unit determined by $^1$H-NMR measurement were 93.8%, 17.6% by mass and 42.9% by mass, respectively.

A solution of the synthesized tBSSIStBS in cyclohexane was prepared, the solution was put in a pressure proof vessel whose atmosphere had sufficiently been replaced with nitrogen, and then, hydrogenation reaction was conducted at 50° C. for 12 hours in an atmosphere of hydrogen using an Ni/Al Ziegler hydrogenating catalyst to obtain a poly(4-tert-butylstyrene)-b-polystyrene-b-hydrogenated polyisoprene-b-polystyrene-b-poly(4-tert-butylstyrene) (hereinafter abbreviated as tBSSEPStBS). The hydrogenation proportion of the tBSSEPStBS was calculated by $^1$H-NMR spectrum measurement to be 99.9%.

Referential Example 4

Synthesis of Sulfonated tBSSEPStBS

In a similar process to that of Referential example 2, a sulfonated tBSSEPStBS was prepared. Specifically, first, a sulfonating reagent was prepared by reacting 19.2 ml of acetic anhydride with 8.6 ml of sulfuric acid at 0° C. in 38.4 ml of methylene chloride. Separately, 100 g of the block copolymer tBSSEPStBS obtained in Referential example 3 was vacuum dried for 1 hour in a glass-made reaction vessel equipped with a stirrer, the inside atmosphere of the reaction vessel was replaced with nitrogen, 840 ml of methylene chloride was added, and the mixture was stirred at 35° C. for 4 hours to dissolve the block copolymer. After the dissolution, the sulfonating reagent was gradually added dropwise thereto over a period of 20 minutes. After stirring at 35° C. for 1 hour, the polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated tBSSEPStBS. The ion exchange capacity of the sulfonated tBSSEPStBS was 0.50 meq/g.

Referential Example 5

Preparation of a Block Copolymer Composed of Polystyrene (Polymer Block (A)), Hydrogenated Polyisoprene (Polymer Block (B1)) and Poly(4-tert-butylstyrene) (Polymer Block (B2))

In a similar process to a previously reported process (JP 2007-258162 A), a polystyrene-poly(4-tert-butylstyrene)-b-polyisoprene-b-poly(4-tert-butylstyrene-b-polystyrene) (hereinafter, abbreviated as StBSItBSS) was synthesized by putting 568 ml of dehydrated cyclohexane and 1.14 ml of sec-butyllithium (1.3M-cyclohexane solution) in a 1,000-ml egg-plant type flask, adding successively 4.27 ml of styrene, 53.3 ml of 4-tert-butylstyrene, 66.4 ml of isoprene, 52.6 ml of 4-tert-butylstyrene and 9.30 ml of styrene, and polymerizing them respectively at 60° C. The number average molecular weight (GPC measurement, in terms of polystyrene) of the obtained StBSItBSS was 167,471, and the amount of the 1,4-bond, the content of the styrene unit and the content of the 4-tert-butylstyrene unit determined by $^1$H-NMR measurement were 93.5%, 9.6% by mass and 62.2% by mass, respectively.

A solution of the synthesized StBSItBSS in cyclohexane was prepared, the solution was put in a pressure proof vessel whose atmosphere had sufficiently been replaced with nitrogen, and then, hydrogenation reaction was conducted at 50° C. for 12 hours in an atmosphere of hydrogen using an Ni/Al Ziegler hydrogenating catalyst to obtain a polystyrene-b-poly (4-tert-butylstyrene)-b-hydrogenated polyisoprene-b-poly (4-tert-butylstyrene)-b-polystyrene (hereinafter abbreviated as StBSEPtBSS). The hydrogenation proportion of the StBSEPtBSS was calculated by $^1$H-NMR spectrum measurement to be 99.9%.

Example 1

(1) Synthesis of Sulfonated StBSEPtBSS

In a similar process to that of Referential example 2, a sulfonated StBSEPtBSS was prepared. Specifically, first, a sulfonating reagent was prepared by reacting 14.8 ml of acetic anhydride with 6.62 ml of sulfuric acid at 0° C. in 29.6 ml of methylene chloride. Separately, 20 g of the block copolymer StBSEPtBSS obtained in Referential example 5 was vacuum dried for 1 hour in a glass-made reaction vessel equipped with a stirrer, the inside atmosphere of the reaction vessel was replaced with nitrogen, 262 ml of methylene chloride was added, and the mixture was stirred at room temperature for 4 hours to dissolve the block copolymer. After the dissolution, the sulfonating reagent was gradually added dropwise thereto over a period of 20 minutes. After stirring at room temperature for 48 hours, the polymer solution was diluted with 50 ml of methylene chloride. The resulting polymer solution was poured into 2 L of distilled water under stirring to coagulate and deposit the polymer. The deposited solid matter was washed with distilled water of 90° C. for 30 minutes, and then filtered. This operation of washing and filtration was repeated until the pH of the washings became unchanged, and the polymer after the final filtration was vacuum dried to obtain a sulfonated StBSEPtBSS. The ion exchange capacity of the sulfonated StBSEPtBSS was 0.86 meq/g. The measurement of ion exchange capacity was made according to the following process.

Measurement of Ion Exchange Capacity

A sample was weighed (a (g)) in a glass vessel which can be shut tightly, an excess amount of an aqueous saturated solution of sodium chloride was added thereto, and the mixture was stirred overnight. Hydrogen chloride formed in the system was titrated (b (ml)) with a 0.01 N aqueous NaOH standard solution (titer f) using a phenolphthalein solution as an indicator. The ion exchange capacity of the sample was calculated according to the following equation.

$$\text{Ion exchange capacity} = (0.01 \times b \times f)/a$$

(2) Preparation of an Aqueous Dispersion of the Sulfonated StBSEPtBSS

A 5% by mass solution of the sulfonated StBSEPtBSS (toluene/isobutyl alcohol=8/2) was prepared. While a thin film rotary high speed homogenizer (Filmics made by Primix Co., Ltd.) was rotated at a peripheral speed of 30 m/s, the polymer solution and water were put therein respectively at rates of 70 ml/min and 80 ml/min to cause phase inversion and emulsification. The solvent was removed using an evaporator to obtain an aqueous 5% by mass dispersion of the polymer. The average particle size of the sulfonated StBSEPtBSS in the aqueous dispersion was about 7.0 μm.

(3) The Aqueous Dispersion Obtained in (2) was Treated by a High Pressure Homogenizer (Nanomizer Mark II Made by Yoshida Kikai Kogyo Co., Ltd.) to Obtain an Aqueous Dispersion of the Sulfonated StBSEPtBSS Having an Average Particle Size of about 59 nm.

(4) Preparation of an Electrolyte Membrane

An electrolyte membrane of thickness 50 μm and size 9 cm×9 cm (hereinafter referred to as test membrane A) was prepared by a known process from the sulfonated mSEBmS obtained in Referential example 2.

(5) Preparation of Gas Diffusion Electrodes

A gas diffusion electrode was prepared by mixing a dispersion of perfluorocarbonsulfonic acid made by Dupont Co. as an electrolyte with a catalyst to prepare a catalyst paste wherein the catalyst was uniformly dispersed, applying the catalyst paste uniformly onto one side of water repellent treated carbon paper, leaving alone the resulting carbon paper at room temperature for several hours, and drying it at 115° C. for 30 minutes. As the catalyst for the anode was used Pt—Ru supported on carbon made by Tanaka Kikinzoku Kogyo Co., Ltd. (TEC61E54), and as the catalyst for the cathode was used Pt supported on carbon made by Tanaka Kikinzoku Kogyo Co., Ltd. (TEC10E50E). The prepared gas diffusion electrodes had the following compositions respectively: anode; Pt 1.00 mg/cm$^2$, Ru 0.77 mg/cm$^2$, polymer 1.57 mg/cm$^2$; cathode; Pt 1.00 mg/cm$^2$, polymer 1.20 mg/cm$^2$.

(6) Preparation of a Membrane-Electrode Assembly

An intermediate layer was formed by spray applying and drying the dispersion obtained in Example 1(3) onto both sides of the test membrane A, and a membrane-electrode assembly was prepared by sticking together the gas diffusion electrodes obtained in Example 1(5) (5 cm×5 cm) and the test membrane A on which the intermediate layers was formed.

Example 2

(1) Preparation of an Electrolyte Membrane

An electrolyte membrane of thickness 50 μm and size 9 cm×9 cm (hereinafter referred to as test membrane B) was prepared by a known process from the sulfonated tBSSEP-StBS obtained in Referential example 4.

(2) Preparation of a Membrane-Electrode Assembly

A membrane-electrode assembly was prepared in the same way as in Example 1(6) except that the test membrane B was used.

Example 3

(1) Preparation of an Aqueous Dispersion of the Sulfonated StBSEPtBSS

The aqueous dispersion obtained in Example 1(2) was treated by a high pressure homogenizer (Nanomizer mark II made by Yoshida Kikai Kogyo Co., Ltd.) to obtain an aqueous dispersion of the sulfonated StBSEPtBSS having an average particle size of about 85 nm.

(2) Preparation of a Membrane-Electrode Assembly

An intermediate layer was formed by spray applying the dispersion obtained in Example 3(1) onto both sides of the test membrane A, and a membrane-electrode assembly was prepared by sticking together the gas diffusion electrode obtained in Example 1(5) (5 cm×5 cm) and the test membrane A on which the intermediate layers were formed.

Example 4

Preparation of a Membrane-Electrode Assembly

A membrane-electrode assembly was prepared in the same way as in Example 3(2) except that the test membrane B was used.

Example 5

(1) Preparation of an Aqueous Dispersion of the Sulfonated StBSEPtBSS

The aqueous dispersion obtained in Example 1(2) was treated by a high pressure homogenizer (Nanomizer mark II made by Yoshida Kikai Kogyo Co., Ltd.) to obtain an aqueous dispersion of the sulfonated StBSEPtBSS having an average particle size of about 117 nm.

(2) Preparation of a Membrane-Electrode Assembly

An intermediate layer was formed by spray applying the dispersion obtained in Example 5(1) onto both sides of the test membrane A, and a membrane-electrode assembly was prepared by sticking together the gas diffusion electrodes obtained in Example 1(5) (5 cm×5 cm) and the test membrane A on which the intermediate layers were formed.

Example 6

Preparation of a Membrane-Electrode Assembly

A membrane-electrode assembly was prepared in the same way as in Example 5(2) except that the test membrane B was used.

Example 7

Preparation of a Membrane-Electrode Assembly

An intermediate layer was formed by spray applying the dispersion obtained in Example 5(1) onto the surface of the electrode catalyst layer of each of the gas diffusion electrodes obtained in Example 1(5), and a membrane-electrode assembly was prepared by sticking together the gas diffusion electrodes (5 cm×5 cm) on each of which the intermediate layer was formed and the test membrane A.

Example 8

Preparation of a Membrane-Electrode Assembly

A membrane-electrode assembly was prepared in the same way as in Example 7 except that the test membrane B was used.

Comparative Example 1

Preparation of a Membrane-Electrode Assembly

A membrane-electrode assembly was prepared by sticking together the test membrane A and the gas diffusion electrodes (5 cm×5 cm) obtained in Example 1(5).

Comparative Example 2

Preparation of a Membrane-Electrode Assembly

A membrane-electrode assembly was prepared in the same way as in Comparative example 1 except that the test membrane B was used.

Comparative Example 3

Preparation of a Membrane-Electrode Assembly

A membrane-electrode assembly was prepared by sticking together through hot pressing (130° C., 20 kgf/cm$^2$, 8 min) the test membrane A and the gas diffusion electrodes (5 cm×5 cm) obtained in Example 1(5).

Comparative Example 4

Preparation of a Membrane-Electrode Assembly

A membrane-electrode assembly was prepared in the same way as in Comparative example 3 except that the test membrane B was used.

Comparative Example 5

Preparation of a Membrane-Electrode Assembly

A Membrane-Electrode Assembly Disclosed in Patent Document 1

An intermediate layer was formed by spray applying the dispersion of perfluorocarbonsulfonic acid made by Dupont Co., which dispersion was used in Example 1(5), onto both surfaces of the test membrane A, and a membrane-electrode assembly was prepared by sticking together through hot pressing (130° C., 20 kgf/cm$^2$, 8 min) the gas diffusion electrodes (5 cm×5 cm) obtained in Example 1(5) and the test membrane A on which the intermediate layers were formed Comparative Example 6

Preparation of a Membrane-Electrode Assembly

A Membrane-Electrode Assembly Disclosed in Patent Document 1

An intermediate layer was formed by spray applying the dispersion of perfluorocarbonsulfonic acid made by Dupont Co., which dispersion was used in Example 1(5), onto the surface of the electrode catalyst layer of each of the gas diffusion electrodes obtained in Example 1(5), and a membrane-electrode assembly was prepared by sticking together through hot pressing (130° C., 20 kgf/cm$^2$, 8 min) the gas diffusion electrodes (5 cm×5 cm) on each of which the intermediate layer was formed and the test membrane A.

Comparative Example 7

Preparation of a Membrane-Electrode Assembly

A Membrane-Electrode Assembly Disclosed in Patent Document 1

An intermediate layer was formed by spray applying a dispersion of the sulfonated mSEBmS in tetrahydrofuran onto the surface of the electrode catalyst layer of each of the gas diffusion electrodes obtained in Example 1(5), and a membrane-electrode assembly was prepared by sticking together the gas diffusion electrodes (5 cm×5 cm) on each of which the intermediate layer was formed and the test membrane A.

Comparative Example 8

Preparation of a Membrane-Electrode Assembly

A Membrane-Electrode Assembly Disclosed in Patent Document 2

An intermediate layer was formed by spray applying a mixture liquid prepared by mixing the dispersion of perfluorocarbonsulfonic acid made by Dupont Co., which dispersion was used in Example 1(5), with carbon black (Valcan XC72) so that the mass ratio of the perfluorocarbonsulfonic acid/the carbon black could be 50/50, onto the surface of the electrode catalyst layer of each of the gas diffusion electrodes obtained in Example 1(5), and a membrane-electrode assembly was prepared by sticking together through hot pressing (130° C., 20 kgf/cm$^2$, 8 min) the gas diffusion electrodes (5 cm×5 cm) on each of which the intermediate layer was formed and the test membrane A.

Comparative Example 9

Preparation of a Membrane-Electrode Assembly

A Membrane-Electrode Assembly Disclosed in Patent Document 2 or 3

An intermediate layer was formed by spray applying a mixture liquid prepared by mixing the sulfonated mSEBmS obtained in Referential example 2 with carbon black (Valcan XC72) so that the mass ratio of the sulfonated mSEBmS/the carbon black could be 50/50, onto the surface of the electrode catalyst layer of each of the gas diffusion electrodes obtained in Example 1(5), and a membrane-electrode assembly was prepared by sticking together the gas diffusion electrodes (5 cm×5 cm) on each of which the intermediate layer was formed and the test membrane A.

Performance Tests of the Membranes and the Membrane-Electrode Assemblies of Examples and Comparative Examples 1) Measurement of the Ion Conductivity of the Membranes As to the test membrane A and the test membrane B, each membrane cut into a size of 1 cm×4 cm was put between 4 platinum wires to prepare a measurement cell. The measurement cell was immersed in water of a temperature of 40° C., and ion conductivity was measured by an alternative current 4 terminal method in the direction of the membrane surface.

2) Evaluation of the Power Generation Performance of a Single Cell for Fuel Cells Each of the membrane-electrode assemblies prepared in Examples 1 to 8 and Comparative examples 1 to 6 was put between two sheets of electrically conductive separators also having a role of paths for gas supply, the resulting composite was put between two electric current-collecting sheets, and the resulting composite was put between two clamping sheets to assemble a single cell for polymer electrolyte fuel cells. A gasket was placed between each membrane-electrode assembly and each separator for preventing gas leak from a difference in level corresponding to the thickness of the electrode. As the fuel, an aqueous 1 mol/L MeOH solution was used, and as the oxidizing agent, oxygen humidified by a bubbler of 60° C. was used. Test conditions were set as follows, and electric resistance was evaluated after power generation was made for 2 hours under the condition of an electric current value of 50 mA/cm$^2$: the test conditions; anode flow rate: 1 ml/min, cathode flow rate: 175 ml/min, cell temperature: 40° C. The electric resistance was measured under the condition of an electric current value of 50 mA/cm$^2$ by an electric current breaking method.

Electron Microscope Photographs of the Membrane-Electrode Assemblies Obtained in Example 3 and Comparative Example 5

Figure 2:
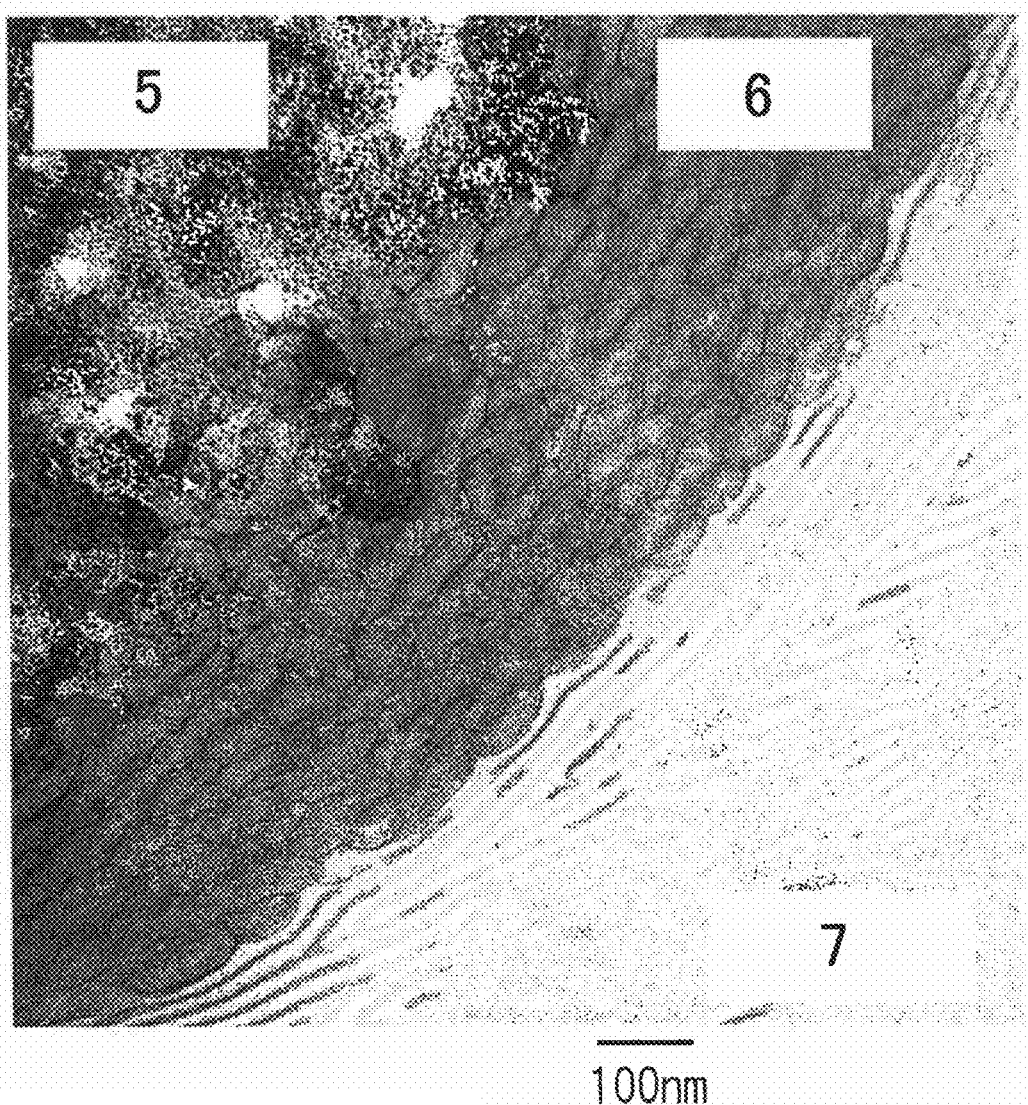
FIG. 2 is an electron microscope photograph at the section of the membrane electrode assembly for polymer electrolyte fuel cells obtained in Example 3.
Figure 3:
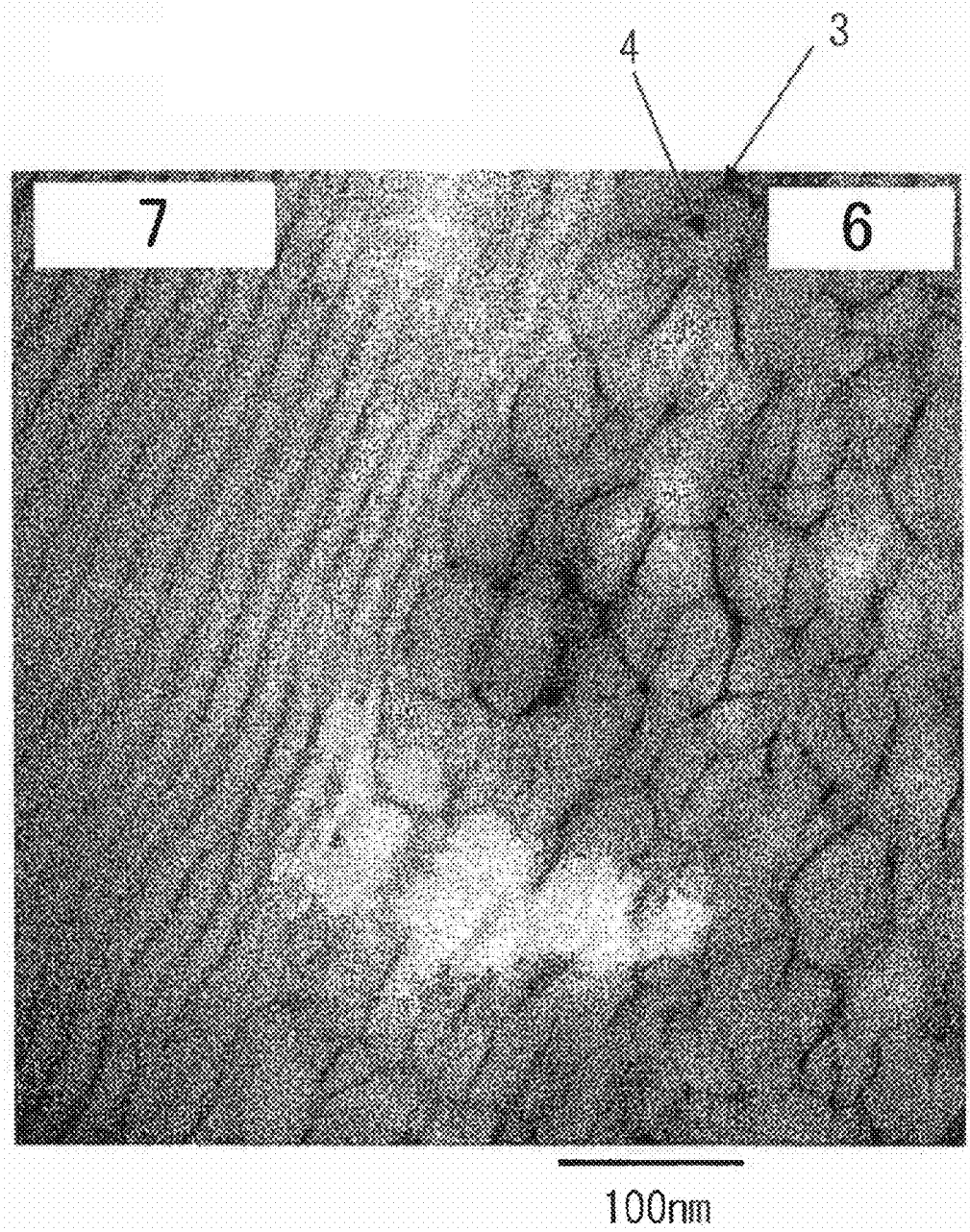
FIG. 3 is an electron microscope photograph at the section of the membrane electrode assembly for polymer electrolyte fuel cells obtained in Example 3.

Electron microscope photographs at the section of the membrane-electrode assembly obtained in Example 3 are shown in FIG. 2 and FIG. 3. The membrane-electrode assembly obtained in Example 3 was observed in phase separation structure by selectively dyeing the sulfonic acid groups of the electrolyte materials, which constitute the membrane-electrode assembly, using lead acetate.

The block copolymer in the intermediate layer forms a core-shell structure wherein the phase having ion-conductive groups is a shell phase and the phase having no ion-conductive group is a core phase. The shell phase in the core-shell structure forms continuous ion paths, and such a structure was clearly shown that both of the bonding part between the intermediate layer and the electrolyte membrane and the bonding part between the intermediate layer and the electrode catalyst layer are formed by the shell phase.

Figure 4:
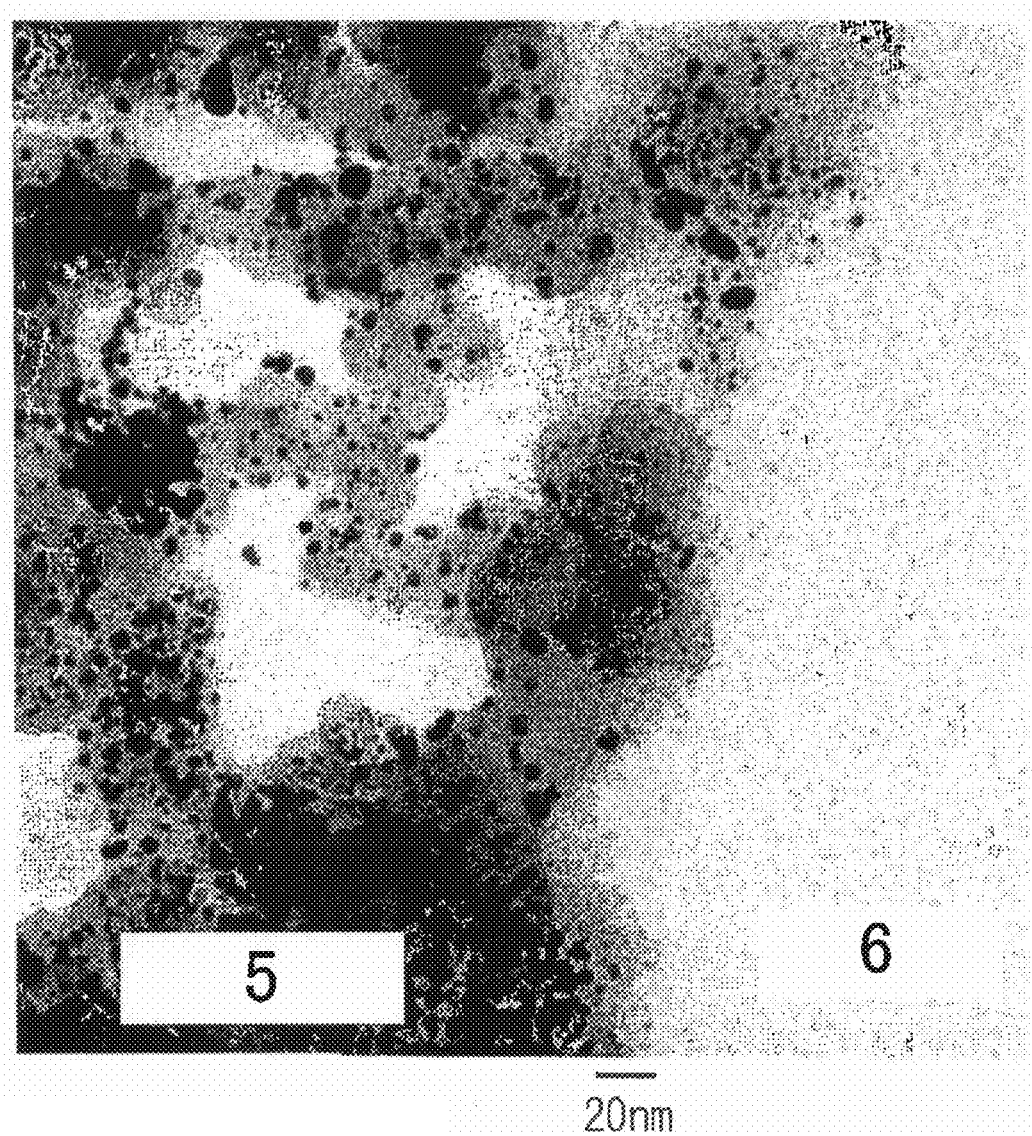
FIG. 4 is an electron microscope photograph at the section of the membrane electrode assembly for polymer electrolyte fuel cells obtained in Comparative Example 5.

An electron microscope photograph at the section of the membrane-electrode assembly which was obtained in Comparative example 5 and subjected to the same dyeing treatment as above is shown in FIG. 4. Phase separation of the intermediate layers is not observed.

Results of the Performance Tests

The ion conductivities of the test membrane A and the test membrane B used in Examples 1 to 8 and Comparative examples 1 to 6 were 0.024 S/cm and 0.017 S/cm, respectively. As to Examples 1 to 8 and Comparative examples 1 to 6, the electric resistances of the single cells at 50 mA/cm² were measured, and the results are shown in Table 1.

TABLE 1

|  | Electrolyte membrane | Intermediate layers | Process of forming intermediate layers | Condition of hot pressing | Electric resistance of cell |
|---|---|---|---|---|---|
| Exam. 1 | Test membrane A | Average particle size 59 nm | Formed on the surfaces of the membrane | No pressing | 45 mΩ |
| Exam. 2 | Test membrane B | | | | 41 mΩ |
| Exam. 3 | Test membrane A | Average particle size 85 nm | Formed on the surfaces of the membrane | No pressing | 37 mΩ |
| Exam. 4 | Test membrane B | | | | 29 mΩ |
| Exam. 5 | Test membrane A | Average particle size 117 nm | Formed on the surfaces of the membrane | No pressing | 40 mΩ |
| Exam. 6 | Test membrane B | | | | 32 mΩ |
| Exam. 7 | Test membrane A | | Formed on the catalyst layers | No pressing | 44 mΩ |
| Exam. 8 | Test membrane B | | | | 38 mΩ |
| Com. exam. 1 | Test membrane A | No intermediate layer | — | No pressing | 71 mΩ |
| Com. exam. 2 | Test membrane B | | | | Measurement impossible |
| Com. exam. 3 | Test membrane A | No intermediate layer | — | 130° C. 20 kgf/cm² 8 min | 63 mΩ |
| Com. exam. 4 | Test membrane B | | | | 70 mΩ |
| Com. exam. 5 | Test membrane A | Nafion | Formed on the surfaces of the membrane | 130° C. 20 kgf/cm² 8 min | 48 mΩ |
| Com. exam. 6 | Test membrane A | Nafion | Formed on the catalyst layers | | 54 mΩ |
| Com. exam. 7 | Test membrane A | Sulfonated mSEBmS | Formed on the catalyst layers | No pressing | 88 mΩ |
| Com. exam. 8 | Test membrane A | Nafion/Carbon black = 50/50 | Formed on the catalyst layers | 130° C. 20 kgf/cm² 8 min | 52 mΩ |
| Com. exam. 9 | Test membrane A | Sulfonated mSEBmS/ Carbon black = 50/50 | Formed on the catalyst layers | No pressing | 91 mΩ |

Exam.: Example
Com. exam.: Comparative example

From the tests of Example 1, Example 3, Example 5, Example 7, Comparative example 1 and Comparative example 3 wherein the test membrane A was used, the effect of introduction of the intermediate layers of the invention was shown. Likewise, also from the tests of Example 2, Example 4, Example 6, Example 8, Comparative example 2 and Comparative example 4 wherein the test membrane B was used, the effect of the invention was shown. From the tests of Examples 1 to 8, Comparative example 5 and Comparative example 6, it was shown that the intermediate layers of the invention which are comprised of the ion conductor of the invention having the core-shell structure in which ion conductor ion channels are controlled are more effective for reduction of interface resistance between the membrane and the electrodes than the case wherein Nafion was introduced into the membrane-electrode bonding parts (which is also the method disclosed in Patent Document 1). Further, from the tests of Examples 1 to 8, Comparative example 1, Comparative example 3 and Comparative examples 7 to 9, it was shown that the invention using the intermediate layers which are comprised of the ion conductor having the core-shell structure, in which ion conductor ion channels are controlled, and the invention using the intermediate layers which are comprised of the sulfonated mSEBmS are more effective for reduction of interface resistance between the membrane and the electrodes than the method which was disclosed in Patent Documents 1 and 2 and comprises forming an uneven structure at the interface parts between the electrolyte membrane and the electrodes and the method which was disclosed in Patent Document 3 and prevents the membrane from damage and relieves stress to the membrane by putting an intermediate layer. The membrane-electrode assemblies having as an intermediate layer the ion conductor having a core-shell structure, in which ion conductor ion channels are controlled, and the membrane-electrode assemblies having as an intermediate layer the sulfonated mSEBmS showed open circuit voltages almost equal to or more than those shown by the membrane-electrode assemblies of the Comparative example wherein Nafion was introduced into the membrane-electrode bonding parts. Moreover, in the membrane-electrode assemblies of the invention, no peeling nor the like was observed at all even after the power generation test, and they were excellent in bonding strength.

The invention claimed is:

1. A membrane-electrode assembly, comprising a polymer electrolyte membrane and two gas diffusion electrodes bonded to the polymer electrolyte membrane so that the polymer electrolyte membrane is between the two gas diffusion electrodes, in which assembly each gas diffusion electrode comprises an electrode catalyst layer and a gas diffusion layer, wherein:
   at least one intermediate layer, being an ion conductor, is arranged between at least one electrode catalyst layer and the polymer electrolyte membrane adjacent;
   the ion conductor comprises a block copolymer comprising a polymer block (A) having at least one ion-conductive group and a polymer block (B) having no ion-conductive group;

polymer block (A) and polymer block (B) phase-separate from each other;

polymer block (A) forms a continuous phase; and at least one contact part of the at least one intermediate layer with the polymer electrolyte membrane and the at least one contact part of the at least one intermediate layer with the electrode catalyst layer comprise polymer block (A).

2. The membrane-electrode assembly according to claim 1 wherein a repeating unit of polymer block (A) is an aromatic vinyl compound unit.

3. The membrane-electrode assembly according to claim 2, wherein the aromatic vinyl compound is selected from the group consisting of α-methylstyrene and styrene, wherein 1 to 3 aromatic hydrogen atoms are replaced, in each case, with an alkyl group having 1 to 4 carbon atoms.

4. The membrane-electrode assembly according to claim 1 wherein polymer block (B) comprises a rubber polymer block (B1).

5. The membrane-electrode assembly according to claim 4 wherein polymer block (B1) is a polymer block comprising, as a repeating unit at least one unit selected from the group consisting of an alkene unit having 2 to 8 carbon atoms, a conjugated diene unit having 4 to 8 carbon atoms, and a conjugated diene unit having 4 to 8 carbon atoms, whereby, in the repeating unit, part or all of carbon-carbon double bonds are hydrogenated.

6. The membrane-electrode assembly according to claim 1, wherein polymer block (B) comprises polymer block (B1) and a structure-holding polymer block (B2), phase separating from polymer block (A) and polymer block (B1).

7. The membrane-electrode assembly according to claim 6 wherein a repeating unit polymer block (B2) is an aromatic vinyl compound unit.

8. The membrane-electrode assembly according to claim 1 wherein the block copolymer has such a structure that polymer block (A) is at both ends.

9. The membrane-electrode assembly according to claim 6 wherein the block copolymer has such a structure that polymer block (B1) is in the center, polymer block (B2) is adjacent to each side of polymer block (B1), and polymer block (A) is adjacent to each outer side of polymer block (B2).

10. The membrane-electrode assembly according to claim 1 wherein the at least one ion-conductive group is a cation-conductive group selected from the group consisting of a sulfonic acid group, a phosphonic acid group, an alkali metal salt of a sulfonic acid, an alkali metal salt of a phosphonic acid, an ammonium salt of a sulfonic acid, and an ammonium salt of phosphonic acid.

11. The membrane-electrode assembly according to claim 1 wherein the ion conductor has a spherical core-shell structure wherein polymer block (A) is a shell phase and polymer block (B) is a core phase.

12. The membrane-electrode assembly according to claim 1, wherein the ion conductor is one obtained by removing an aqueous dispersion medium from a dispersion comprising the block copolymer and, optionally, at least one additive, dispersed in an aqueous dispersion medium so that the particle size of the block copolymer is 1 μm or less.

13. A polymer electrolyte fuel cell comprising the membrane-electrode assembly according to claim 1.

* * * * *